United States Patent
Ganiaris

[15] 3,656,315
[45] Apr. 18, 1972

[54] COFFEE FREEZE CONCENTRATION APPARATUS

[72] Inventor: Neophytos Ganiaris, Riverside, N.Y.
[73] Assignee: Struthers Scientific and International Corporation, New York, N.Y.
[22] Filed: Sept. 29, 1969
[21] Appl. No.: 870,816

Related U.S. Application Data

[60] Division of Ser. No. 512,365, Dec. 8, 1965, abandoned, which is a continuation-in-part of Ser. No. 321,020, Nov. 4, 1963, Pat. No. 3,283,522.

[30] Foreign Application Priority Data

Nov. 25, 1966 Great Britain.....................52,925/66

[52] U.S. Cl......................................62/124, 99/71, 99/205
[51] Int. Cl...............................................B01d 9/04
[58] Field of Search ................99/152, 236, 71, 77; 62/123, 62/124, 58

[56] References Cited

UNITED STATES PATENTS

| | | | |
|---|---|---|---|
| 2,408,260 | 9/1946 | Kellogg | 99/71 |
| 2,588,337 | 3/1952 | Sperti | 99/205 |
| 2,815,288 | 12/1957 | McKay | 99/205 |
| 3,205,078 | 9/1965 | Lund | 99/205 |
| 3,269,136 | 8/1966 | Umano | 62/123 |
| 3,474,723 | 10/1969 | Reimus et al. | 99/71 X |

Primary Examiner—William E. Wayner
Attorney—William A. Drucker

[57] ABSTRACT

A system of apparatus is disclosed which concentrates coffee extracts by freeze concentration in which the ice formed in a crystallizer is centrifuged from coffee extract and then is washed in the centrifuge and melted. The washings and melted ice contain dissolved coffee which is recovered.

1 Claim, 1 Drawing Figure

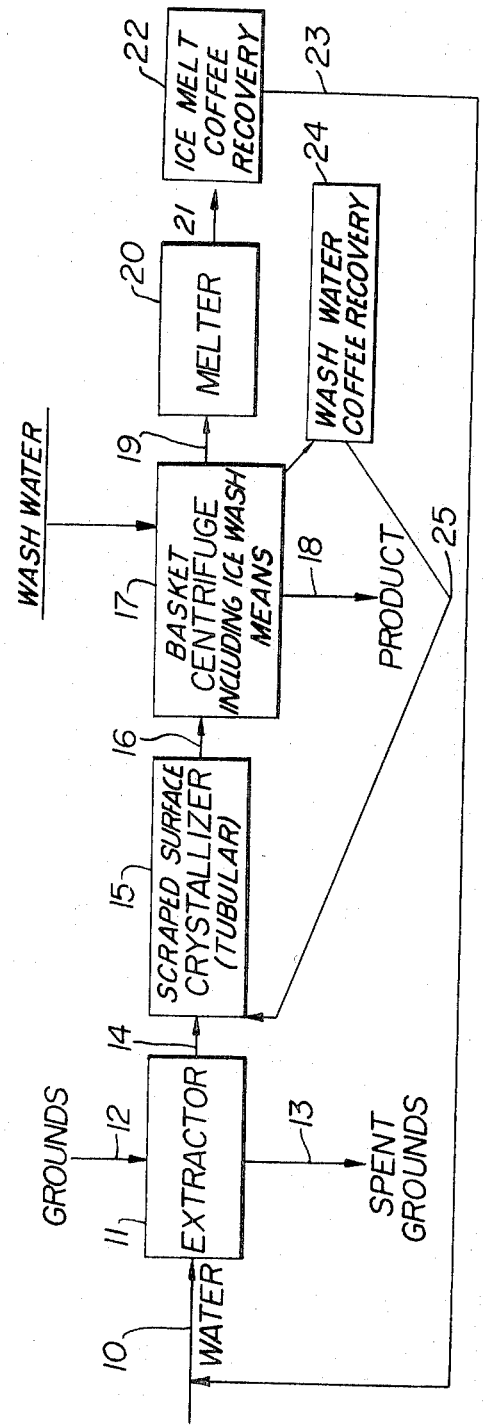

COFFEE FREEZE CONCENTRATION APPARATUS

This application is a division of Ser. No. 512,365 filed Dec. 8, 1965, and forfeited on June 20, 1969, which is a continuation-in-part of Ser. No. 321,020 filed Nov. 4, 1963 and now U.S. Pat. No. 3,283,522 of Nov. 8, 1966.

This invention relates to an improvement in a process for the preparation of concentrated comestible extracts and is particularly applicable to the preparation of soluble coffee solids, or "instant coffee." More particularly, this invention relates to the preparation of aqueous coffee extracts and the concentration of the extract by partial freezing of the aqueous concentrate.

Soluble or "instant" coffee has been prepared by first extracting coffee beans with hot water and subsequently dehydrating the extract by spray drying under vacuum conditions. This process has met with vast commercial success, but the flavor of the soluble coffee leaves much to be desired. The vacuum conditions employed not only remove water from the extract, but also cause volatile taste and flavor elements of the coffee to evaporate. The resulting soluble product is, therefore, never as good as the extract from which it is prepared.

To improve the flavor of the soluble coffee, it has been often proposed to remove substantial amounts of water in the extract by partially freezing the extract and separating the resulting pure ice crystals from the concentrated extract. This process of partial freezing is then followed by a complete dehydration under vacuum conditions. In this way, the coffee loses less of the volatile components by virtue of the fact that the extract is subject to vacuum conditions for shorter periods of time.

In a preferred embodiment of the concentration process, freshly roasted coffee grounds are extracted countercurrently with hot water and the extract produced is partially frozen by indirect refrigeration in a suitable crystallizer and the resulting slurry of ice and concentrate is subjected to centrifugation to separate the ice from the concentrate. In order for the process to be economical, this separation and the subsequent water wash of the crystals on the centrifuge basket must effect a relatively complete removal of mother liquor from the ice crystals.

This problem of ice-aqueous extract separation is not a problem exclusive to coffee extracts alone, but is also encountered in the preparation of other concentrated extracts of comestible materials. Thus, the process of this invention is also applicable for the improved preparation of concentrated extracts of comestible extracts such as tea, chicory or the like.

It is, therefore, an object of this invention to provide an improved process for preparing extracts of comestible products, and the concentrating of said extracts by partial freezing.

Another object of this invention is to provide an improved process for extracting and concentrating soluble coffee solids wherein the concentrating is by partial freezing of the extract.

The objects of this invention are accomplished by a process which comprises the preparation of a comestible extract by extraction, concentration of the extract by partial freezing of the water therefrom, separating the mixture resulting from the partial freezing, melting the ice having adhering mother liquor, and returning the melt to the extraction step.

A preferred embodiment of this invention is a process which comprises extracting coffee beans at elevated temperature with water, removing part of the water by partial freezing, separating the resulting ice from the mother liquor, and melting the ice with subsequent recycling of the solution produced to the extraction step so as not to expend valuable coffee concentrate which adheres to or is occluded in the ice. In one preferred embodiment of this invention the ice-coffee concentrate slurry is separated using a rotating basket centrifuge.

A particularly preferred embodiment of this invention comprises preparing and concentrating the extract as above, separating ice crystals from the concentrated extract and then washing the ice crystals prior to melting and recycle to the extraction step.

Washing of the ice is normally done during centrifugation and is most desirable when the mother liquor of the slurry contains about 20 per cent or more dissolved coffee solids by weight. It has been found that at concentrations above about 20 per cent the high viscosity of the mother liquor limits the separation efficiency of the centrifuge and excessive amounts of solids remain with the ice which is melted. However, at concentrations below 20 per cent washing is not necessary according to this invention.

The initial steps in the process of preparing instant coffee are the same as preparing regular coffee. Following roasting, the coffee is ground, but the granulation may be extremely coarse and, in some cases, fine particles that may result from grinding are sieved out and used elsewhere.

The grounds are placed in closed containers known as extractors. These extractors are set up in batteries with several extractors to a battery.

Ground coffee and hot water are charged into the first extractor. The coffee is then extracted until the necessary materials have been removed from the grounds. The resulting extract is then charged into the second extractor containing fresh coffee. The second extractor is run until extraction is completed. The resulting coffee extract (which is now stronger than ordinary coffee beverage) is placed in the third extractor containing fresh grounds and the brewing process is again repeated.

In commercial plant operation, the process is conducted in a semi-continuous manner, the fresh water coming into an extraction battery first reaches the extractor having the most spent, exhausted grounds and proceeds from there to the next most spent grounds and so on until, finally in the last extractor it reaches the fresh, most recently added grounds. This is known as countercurrent extraction system.

Temperature and pressure in the extractor system will vary greatly. Coffee being produced from fresh grounds is usually processed at low temperature with low pressure. Coffee being produced from spent, exhausted grounds is extracted at high temperature and under high pressure.

The coffee extract to be concentrated by freeze concentration can have any coffee solids content from a few per cent such as 10 per cent to as high as 40 to 50 per cent. That is, there may be as much as 40 to 50 lbs. of coffee solids in the extract for each 100 lbs. of extract. However, the lower the solids content of the extract, the more the water which must be removed during the freeze concentration and drying steps. On the other hand, it has been found that carrying the extraction process to the point where high coffee solids content can be achieved often lowers the flavor of the extract. Thus, a preferred range of coffee solids content of the extract for the practice of this invention is from about 15 to 30 per cent coffee solids.

The concentrated coffee solution resulting from extraction is then subjected to concentration by partial freezing of the water therefrom. This freeze concentration process can be conducted in batch, semi-continuous or continuous apparatus according to methods known to the art and improvements of the methods. However, any method of removing the water from the coffee extract by crystallization as ice is applicable to the process of this invention. The resulting slurry of ice and concentrated coffee extract is then subjected to centrifugation to free the concentrated solution of the ice crystals. The resulting ice crystals are ordinarily washed with water or dilute coffee extract to free the ice crystals of mother liquor and the washings may be returned to the freeze concentration process. Normal washing will not completely remove all remaining traces of adhering mother liquor from the ice crystals. Only upon exhaustive washing will the ice crystals be essentially free of mother liquor. However, recycle of wash water containing these valuable dissolved coffee solids would not be economic under conditions of exhaustive washing because the heat transfer surfaces of the crystallization vessels would have to be proportionally larger to provide for greater quantities of ice crystals which must be formed in the vessels. After the ice is removed from the centrifuge it is melted in a suitable vessel. The solution produced will normally contain up to 10 per cent by weight of dissolved coffee solids. However, it is preferred to adjust the process conditions so that the melted ice will contain up to 5 per cent by weight of dissolved coffee solids. By adjusting the conditions so that the melted ice will contain the lowest amount of dissolved coffee solids possible, it can be seen that an economic advantage can be realized in that less heat transfer surface within the crystallizer will be required. This solution is recycled to the extraction step in lieu of fresh water to prepare additional extract, thus utilizing all of the dissolved coffee solids adhering to the ice crystals from the centrifugation step.

The freeze concentration of the extract can be accomplished in either a single stage or in a plurality of stages each of which comprises a crystallizer in which heat is removed from the coffee extract to form a slurry of ice crystals and concentrated mother liquor. After each crystallization stage, ice is removed from the slurry and the concentrated extract either goes to further processing in the preparation of soluble or powdered coffee or is further concentrated in a subsequent stage of the freeze concentration process. The crystallization of ice from the extract is preferably carried out in a tubular heat exchanger, the outside surfaces of which are cooled by a circulating refrigerant. The internal section of the tube is ordinarily fitted with a shaft on which is located agitator paddles. Alternatively, a conventional scraped surface tubular heat exchanger may be employed. Any acceptable separating device or centrifuge may be employed for separating the concentrated coffee extract from the resulting ice crystals. This centrifuge is the preferred method for separating ice from the mother liquor and ordinarily consists of a rotating basket which contains perforations for allowing passage of the mother liquor. The centrifuge may also be equipped with some means for washing residual mother liquor from the ice crystals.

Referring now to the drawing accompanying this application, one possible example of the apparatus system is as follows: freshly roasted coffee grounds enter an extracting apparatus 11 through feed line 12. Water from line 10 also enters the extractor where the coffee solution is brewed. After brewing, the spent grounds are discharged through line 13, and the brew passes through line 14 and enters crystallizer 15 where the temperature is lowered sufficiently to cause ice to form in the extract. The exact degree of concentration depends upon the cooling medium, the temperature, and residence time in the crystallizer. Concentrated slurry of ice and coffee solution is conveyed to the centrifuge 17 by way of line 16. The centrifuge has a rotating basket consisting of an open screen material which allows concentrated coffee solution removal from the outside periphery of the centrifuge through line 18 while the ice passes to the melter 20 by way of line 19. Complete separation of ice and coffee solution is not effected in the centrifuge even though washing may be employed. Coffee is recovered from wash water at 24, for example, by recycle through line 25. In the melting apparatus 20, the ice with adhering or occluded concentrated coffee solution is melted to result in dilute coffee solution. This solution leaves the melter through recycle line 21, and enters the recovery process at 22 and then, for example, enters line 10 where it mixes with the process water for reprocessing.

The following examples are illustrative of the process of this invention.

EXAMPLE 1

Ground coffee and water are charged to a countercurrent extractor and extracted to result in an extract containing 24 per cent soluble coffee solids. This extract was continuously metered into a crystallizer wherein 10 pounds per minute of water formed individual ice crystals to result in a slurry of concentrated coffee, having 32 per cent soluble coffee solids and ice. This slurry was conveyed to a centrifuge having a basket rotating at 2,200 revolutions per minute and a wash water rate of 4 pounds of fresh water per minute. The concentrated solution of coffee was discharged through the perforated rotating basket as product at the rate of 30 pounds per minute and contained 32 per cent soluble coffee solids. The ice, upon melting, was found to contain 1.3 per cent soluble coffee solids.

EXAMPLE 2

The general procedure of Example 1 was repeated except that the dilute coffee solution resulting from melting the ice was recycled to extractor. The resulting extract having 24.5 per cent soluble coffee solids was metered into the crystallizer. The slurry produced was centrifuged and the concentrate leaving the centrifuge as product at the rate of 30 pounds per minute was found to contain 32.5 per cent soluble coffee solids, thus providing 13 more pounds of coffee as product per 1,000 pounds extracted.

The process of this invention is applicable to any aqueous concentrate of a comestible material which is to be extracted, and then concentrated by formation of ice and subsequent removal of ice. Thus, the process of this invention may also be used in connection with the freeze concentration of tea.

Although the invention has been described with reference to particular embodiments thereof, it is to be understood that various changes may be made without departing from the spirit of the invention as defined by the scope of the attendant claims.

In the drawing water 10 and coffee 12 are fed to an extractor 11 and the extract formed is fed by a line 14 to a scraped surface tubular crystallizer 15 to form an ice slurry in concentrated extract. The slurry is conveyed by a line 16 to a basket centrifuge 17 including ice wash means and coffee concentrate is removed by line 18. The ice is washed in the centrifuge and then removed to a melter 20 by line 19 where it is melted and discharged by line 19 to ice melt coffee recovery means and to the product from line 18.

I claim:
1. An apparatus system for coffee concentration comprising the combination of:
  a. a scraped surface tubular heat exchanger for freezing liquid coffee extract to form a mixture of ice and more concentrated coffee extract;
  b. a centrifuge ice separator having a perforate screen basket; and means on said centrifuge for washing ice with water;
  c. a line conveying said mixture from said exchanger to said centrifuge;
  d. means recovering dissolved coffee from ice washings;
  e. a line conveying washings from said centrifuge to said means (d);
  f. ice melting means;
  g. a line conveying ice from said centrifuge to said melting means;
  h. means recovering dissolved coffee from melted ice; and
  i. a line conveying melted ice to said means (h).

* * * * *